United States Patent
Chou

(10) Patent No.: US 10,329,463 B2
(45) Date of Patent: Jun. 25, 2019

(54) PROCESS FOR MAKING PRESSURE-SENSITIVE ADHESIVE AND DUCT TAPE

(71) Applicant: Shurtape Technologies, LLC, Hickory, NC (US)

(72) Inventor: Kevin Chou, Denver, NC (US)

(73) Assignee: SHURTAPE TECHNOLOGIES, LLC, Hickory, NC (US)

( * ) Notice: Subject to any disclaimer, the term of this patent is extended or adjusted under 35 U.S.C. 154(b) by 301 days.

(21) Appl. No.: 15/158,675

(22) Filed: May 19, 2016

(65) Prior Publication Data
US 2017/0335148 A1 Nov. 23, 2017

(51) Int. Cl.
| | | |
|---|---|---|
| *C09J 107/00* | (2006.01) | |
| *C09J 7/38* | (2018.01) | |
| *B29B 7/42* | (2006.01) | |
| *B29C 48/285* | (2019.01) | |
| *C08J 3/20* | (2006.01) | |
| *B29B 7/74* | (2006.01) | |
| *B29B 7/90* | (2006.01) | |
| *C09J 7/22* | (2018.01) | |
| *C08K 3/22* | (2006.01) | |
| *C08K 3/26* | (2006.01) | |
| *C08K 5/09* | (2006.01) | |
| *B29B 7/48* | (2006.01) | |
| *B29B 7/60* | (2006.01) | |
| *B29B 7/72* | (2006.01) | |
| *B29B 7/82* | (2006.01) | |
| *B29K 105/00* | (2006.01) | |
| *B29K 21/00* | (2006.01) | |

(52) U.S. Cl.
CPC ........... *C09J 107/00* (2013.01); *B29B 7/7495* (2013.01); *B29B 7/90* (2013.01); *C08J 3/203* (2013.01); *C09J 7/22* (2018.01); *C09J 7/38* (2018.01); *B29B 7/42* (2013.01); *B29B 7/48* (2013.01); *B29B 7/60* (2013.01); *B29B 7/726* (2013.01); *B29B 7/82* (2013.01); *B29C 48/297* (2019.02); *B29K 2021/00* (2013.01); *B29K 2105/0097* (2013.01); *C08J 2307/00* (2013.01); *C08K 3/22* (2013.01); *C08K 3/26* (2013.01); *C08K 5/09* (2013.01); *C08K 2003/2241* (2013.01); *C08K 2003/265* (2013.01); *C09J 2201/622* (2013.01); *C09J 2205/102* (2013.01); *C09J 2407/00* (2013.01); *C09J 2423/00* (2013.01)

(58) Field of Classification Search
CPC ................ B29C 48/297; B29B 7/24
See application file for complete search history.

(56) References Cited

U.S. PATENT DOCUMENTS

| | | | |
|---|---|---|---|
| 2,410,079 A | 9/1941 | Waldo | |
| 3,900,999 A | 8/1975 | Callan | |
| 4,303,724 A | 12/1981 | Sergeant et al. | |
| 4,992,331 A | 2/1991 | Decoste | |
| 5,108,815 A | 4/1992 | Adams et al. | |
| 5,271,999 A | 12/1993 | Short | |
| 5,322,709 A | 6/1994 | Lulla et al. | |
| 5,539,033 A | 7/1996 | Bredahl et al. | |
| 6,008,304 A | 12/1999 | Nohara et al. | |
| 6,150,017 A * | 11/2000 | Burmeister | C08J 3/20 428/355 R |
| 6,166,110 A | 12/2000 | Bredahl et al. | |
| 6,391,974 B1 | 5/2002 | Ogawa et al. | |
| 6,506,447 B1 | 1/2003 | Hirsch et al. | |
| 6,777,490 B2 | 8/2004 | Mussig et al. | |
| 6,780,271 B1 | 8/2004 | Burmeister et al. | |
| 7,476,416 B2 | 1/2009 | Tynan et al. | |
| 2003/0215628 A1 | 11/2003 | Ma et al. | |
| 2009/0213681 A1* | 8/2009 | Ek | B29B 7/465 366/76.1 |
| 2011/0144233 A1* | 6/2011 | Stollberg | C08C 1/15 523/155 |
| 2011/0172348 A1* | 7/2011 | Hoya | C08L 23/142 524/528 |
| 2015/0024196 A1* | 1/2015 | Hayashi | C09J 7/0214 428/351 |

FOREIGN PATENT DOCUMENTS

| | | |
|---|---|---|
| GB | 1532294 A | 11/1978 |
| WO | 97/23577 A1 | 7/1997 |

OTHER PUBLICATIONS

Arnold, A. et al., "Role of Fatty Acids in Autooxidation of Deproteinized Natural Rubber", J. Nat. Rubber Res. 6(2) (1991) 75-86.
Zaeimoedin et al., J. Rubb. Res., 15(1) Mar. 2012, pp. 46-63.

* cited by examiner

Primary Examiner — Xiao S Zhao
(74) Attorney, Agent, or Firm — Dilworth IP, LLC

(57) ABSTRACT

A continuous process for making a pressure-sensitive adhesive is disclosed. A mixture comprising natural rubber having a Mooney viscosity of 85 to 100, a tackifier, a filler, and 0.1 to 5 wt. % of an added $C_{12}$-$C_{24}$ fatty acid based on the amount of mixture is masticated in a first section of a single- or twin-screw extruder. Mastication of the mixture continues in at least one subsequent extruder section in the presence of additional tackifier. The product is a homogeneous, reduced-viscosity pressure-sensitive adhesive. The minor proportion of added $C_{12}$-$C_{24}$ fatty acid aids mastication of the rubber and enables high throughput without addition of peptizers. Duct tapes made from the adhesives display improved adhesion to steel, better adhesion bond strength, and enhanced seven-day clean removability from even difficult substrates such as marble or ceramic tile.

15 Claims, 1 Drawing Sheet

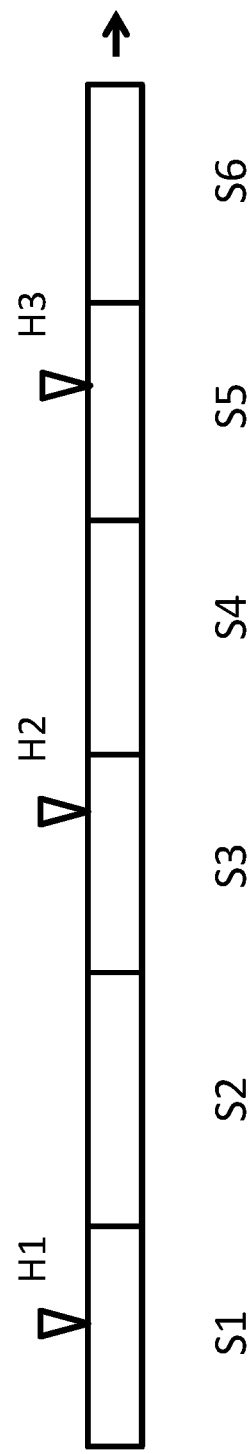

PROCESS FOR MAKING PRESSURE-SENSITIVE ADHESIVE AND DUCT TAPE

FIELD OF THE INVENTION

The invention relates to a process for making natural rubber-based pressure-sensitive adhesive compositions and to duct tapes that utilize the adhesives.

BACKGROUND OF THE INVENTION

Pressure-sensitive adhesives (PSA) for duct tape applications are normally based on natural rubber and/or synthetic elastomers such as polyisoprene. Because untreated natural rubber has a molecular weight greater than about 400,000, it needs to be broken down to more useful molecular weights (e.g., about 100,000) for use in pressure-sensitive adhesives.

The high molecular weight of natural rubber is usually reduced by mastication in a batch process using a Banbury or similar mixer. A typical formulation includes natural rubber, filler, tackifier, and optionally a process oil. "Constant viscosity" grades of rubber, such as "CV60," which has a Mooney viscosity of 60, are available. However, because of the extra processing steps needed, these CV grades are relatively expensive. "Technically specified rubber" (or "TSR" grade rubber) has higher molecular weight and is less expensive. TSR grades of rubber are produced in a range of Mooney viscosities depending on the plantation and country of origin. Processing time required in a Banbury mixer depends on the initial molecular weight of the rubber. In general, higher molecular weight rubbers require a longer mixing time, which hampers productivity.

Extrusion processes for making pressure-sensitive adhesives are known. U.S. Pat. Nos. 5,539,033 and 6,166,110 disclose a continuous extrusion process for making a PSA. Single sources or blends of rubbers are taught as suitable. The references teach to use natural rubbers such as CV60, ribbed smoked sheet, and synthetic rubbers such as polyisoprene and styrene-butadiene rubber (SBR). U.S. Pat. No. 6,777,490 teaches to use an extruder to process an aqueous rubber latex mixture. Relatively high temperatures (up to 170° C.) are needed to evaporate water from the formulation during adhesive processing. U.S. Pat. Nos. 6,506,447; 6,780,271; and 7,476,416 teach to use a modified planetary roller extruder to process rubber. The '447 and '271 patents refer to the process as "mastication-free," while the '416 patent refers to "purposeful mastication" in the planetary roller extruder. According to the '447 and '271 patents, suitable planetary roller extruders can have 7-24 screws or spindles. In general, planetary roller extruders are far more expensive to obtain and maintain when compared with single-screw or twin-screw extruders.

Although low capital investment, high production rates, and low processing costs have made the continuous extrusion process for making PSAs more attractive in recent years, there are several important drawbacks.

We found, for instance, that continuous extrusion processes can provide homogeneous adhesives at high throughput rates when the natural rubber has low to medium molecular weight (as with the CV60 natural rubber described in the '033 and '110 patents). However, when higher molecular weight natural rubbers are used, longer residence times are needed in the extruder to achieve adequate mastication of the rubber. Consequently, the high throughput rates that are a principal advantage of continuous extrusion are sacrificed.

Another option is to add a peptizer (e.g., zinc soaps of unsaturated fatty acids or aromatic disulfides) into the rubber formulation to chemically assist in the breakdown of the high-molecular-weight rubber in the extruder without reducing throughput. However, residual peptizer in the PSA can disrupt aging properties of the resulting tape.

Natural rubber contains traces of various fatty acids, including stearic acid, oleic acid, linoleic acid, and others (see A. Arnold et al., "Role of Fatty Acids in Autooxidation of Deproteinized Natural Rubber, *J. Nat. Rubber Res.* 6 (1991) 75). Fatty acids are sometimes included in rubber compounding processes to enhance vulcanization, particularly in processing rubber for tire manufacture (see, e.g., GB 1,532,294 and U.S. Pat. No. 3,900,999), or to accelerate crosslinking by other active components such as zinc oxide (see, e.g., U.S. Pat. No. 6,780,271).

Duct tapes are constructed using a flexible backing layer, e.g., low-density polyethylene or the like, a cloth scrim, and a rubber adhesive that can penetrate openings in the scrim and bond the scrim to the backing layer (see, e.g., U.S. Pat. Nos. 4,303,724; 4,992,331; 5,108,815; 5,271,999). A challenge with duct tapes is in providing a high level of adhesion while also permitting clean removability of the tape after use. Duct tapes tend to leave behind considerable adhesive residue, particularly when the substrate to which the tape has been attached is marble, ceramic tile, laminate flooring, or carpeting.

A need remains for new ways to manufacture pressure-sensitive adhesives for tape applications from high-molecular-weight natural rubber in a continuous extrusion process without sacrificing productivity and without reliance on chemical peptizers or high process temperatures. Ideally, the expensive and complex planetary roller extruders could be avoided. The industry needs tapes that have strong adhesion on substrate surfaces when applied but leave no residue when the tape is subsequently removed, especially from difficult substrates.

SUMMARY OF THE INVENTION

In one aspect, the invention relates to a two-step continuous process for making a pressure-sensitive adhesive. A first step comprises masticating in a single- or twin-screw extruder a mixture comprising natural rubber, a tackifier, a filler, and an added $C_{12}$-$C_{24}$ fatty acid. The mastication is performed in a first section of the extruder at a temperature within the range of 10° C. to 45° C. The natural rubber has a Mooney viscosity within the range of 85 to 100. An amount of fatty acid within the range of 0.1 to 5 wt. % based on the amount of mixture is used. In a second step, mastication of the mixture continues in at least one subsequent extruder section at a temperature within the range of 45° C. to 100° C. in the presence of additional tackifier. The product is a homogeneous pressure-sensitive adhesive having a viscosity, measured at 150° C. and a shear rate of 5000 $s^{-1}$, at least 15% lower than the viscosity of a pressure-sensitive adhesive prepared by a similar process without the added $C_{12}$-$C_{24}$ fatty acid.

In another aspect, the invention relates to a process for making duct tape. The process comprises preparing a pressure-sensitive adhesive as described above. The adhesive is then calendered onto a backing comprising a polyolefin and a cloth scrim to produce the duct tape.

We surprisingly found that pressure-sensitive adhesives produced by extrusion according to the inventive process in the presence of a minor proportion of an added $C_{12}$-$C_{24}$ fatty acid can be produced from even high-molecular-weight natural rubber with short residence times and without the need for peptizers or a more expensive extruder. Given that numerous fatty acids occur naturally in natural rubber, it is remarkable that introduction of a minor proportion of a $C_{12}$-$C_{24}$ fatty acid would provide benefits in aiding mastication of rubber having high molecular weight. Duct tapes produced using the adhesives display improved adhesion to steel, better adhesion bond strength, and enhanced seven-day clean removability from even difficult substrates such as marble or ceramic tile.

BRIEF DESCRIPTION OF THE DRAWING

FIG. 1 represents a twin-screw extruder in accord with one aspect of the invention. The extruder has six sections (S1-S6) for transferring and/or masticating rubber mixtures and three hoppers (H1-H3) for introducing solid adhesive components. In some aspects, there may be three liquid injection ports (not shown) located near hoppers H1-H3 for introducing molten resins, process oils, or other liquid components.

DETAILED DESCRIPTION OF THE INVENTION

The Single- or Twin-Screw Extruder

The process for making the pressure-sensitive adhesive is performed in a single- or twin-screw extruder. The particular design of the extruder is not believed to be critical. Thus, when a twin-screw extruder is used, it may be co-rotating or counter-rotating and the screws may or may not intermesh. Single- and twin-screw extruders are convenient, cost effective, and commercially available from numerous manufacturers or suppliers. In preferred aspects, a twin-screw extruder is used. Suitable extruders are commercially available from Maris, Coperion, W.W. Brabender Instruments, Farrel Pomini, and others. One particularly suitable example is a co-rotating twin-screw extruder supplied by F. Ili Maris, S.p.A., Italy, having a screw diameter of 150 mm and a length to diameter ratio of 54.

The extruder will normally have multiple sections utilized for combining, mixing, heating, cooling, equilibrating, conveying, masticating, or some combination of these tasks. Temperature can be controlled to a desired value in each section. Usually, two or more of the sections will be equipped with a hopper for introducing solid components or a liquid injection port for liquid components. A suitable extruder configuration is pictured in FIG. 1. In this case, the twin-screw extruder has six sections (S1-S6) for transferring and/or masticating rubber mixtures and three hoppers (H1-H3) for introducing adhesive components.

Usually, the temperature in the extruder sections increases to some maximum value near the exit of extruder, although in some cases it may be desirable to cool the product in one or more sections prior to its exit. Some exemplary temperature ranges for the extruder configuration shown in FIG. 1 are as follows: S1: 70° F.; S2: 70° F.; S3: 100° F.; S4: 115° F.; S5: 115° F.; and S6: 170° F.

A benefit of continuous extrusion is productivity. Desirably, the residence time of material in the extruder will be less than 10 minutes, preferably less than 5 minutes, and in some cases less than 3 minutes. This compares favorably with batch mixing processes, which will normally require 0.5 to 2 hours or more to process an equivalent amount of pressure-sensitive adhesive.

By "continuous," we mean that the process operates continuously as long as there is a need to supply pressure-sensitive adhesive for its downstream use. For instance, the process for generating the pressure-sensitive adhesive can proceed continuously while other components for making the tape or other product are available and ready to utilize the continuously generated adhesive.

Natural Rubber

The inventive process uses natural rubber. Although certain synthetic rubbers might be used in combination, there is no apparent advantage in doing so. The inventive process makes it practical to use natural rubber having high molecular weights. In particular, natural rubber useful herein has a Mooney viscosity within the range of 85 to 100, preferably 90 to 98. This corresponds generally to natural rubber having a weight-average molecular weight ($M_w$) as measured by gel permeation chromatography of at least $0.5 \times 10^6$ g/mol, preferably at least $1 \times 10^6$ g/mol, or $1.5 \times 10^6$ g/mol, and preferably an $M_w$ within the range of $1.6 \times 10^6$ g/mol to $1.0 \times 10^7$ g/mol or $1.6 \times 10^6$ g/mol to $5.0 \times 10^6$ g/mol. The source of the natural rubber is not believed to be critical.

Suitable natural rubber will have a polydispersity of at least 4, preferably at least 4.5, or in some aspects, within the range of 4 to 20, preferably 4.5 to 10.

In one preferred aspect, the natural rubber has a weight-average molecular weight of at least $0.5 \times 10^6$ g/mol and a polydispersity of at least 4.5.

An advantage of the process is the ability to use high-molecular-weight natural rubber (commonly available as "technically specified rubber" or "TSR"), which is less expensive than more highly processed rubbers such as the "constant viscosity" or "CV" grades of rubber (e.g., CV60 rubber, which has a Mooney viscosity of about 60).

The nature of the rubber can vary considerably depending upon the geographic source, season, species of tree, processing performed by the supplier, and other factors. Suitable natural rubber includes "SIR-3" rubber, a TSR grade of standard Indonesian rubber. Suitable natural rubber also includes SMR, STR, and SVR grades of rubber from, respectively, Malaysia, Thailand, and Vietnam. Suitable natural rubber can also originate from China, India, the Philippines, the Ivory Coast, and other nations.

The rubber typically makes up 10 to 50 wt. %, preferably 20 to 40 wt. % or 25 to 35 wt. % of the pressure-sensitive adhesive mixture, which will include the $C_{12}$-$C_{24}$ fatty acid, tackifiers, fillers, and other optional components such as antioxidants, homogenizers, or flow aids.

Tackifier

The pressure-sensitive adhesives include one or more tackifiers. Suitable tackifiers are well known in the art, and many are commercially available from Eastman, Arizona Chemical, Cray Valley, Struktol, and other suppliers. Suitable tackifiers include, for example, rosin acids, partially polymerized rosin acids (e.g., rosin acid dimers), rosin esters, terpene ester resins, hydrocarbon resins, terpene resins, terpene-phenol resins, terpene-hydrocarbon resins, and the like, and mixtures thereof. Piccotac™ 1098 aliphatic $C_5$ hydrocarbon resin (Eastman) and its combination with a rosin acid dimer provide excellent tackification for making pressure-sensitive adhesives suitable for duct tape applications.

The amount of tackifier used in formulating the pressure-sensitive adhesive will depend on many factors, including the source, nature, viscosity, and molecular weight of the natural rubber, the nature of the tackifier, the desired adhesive properties, the identity and amounts of other adhesive components, extruder processing conditions, and other factors. Generally, the amount of tackifier used will be within the range of 10 to 50 wt. %, preferably 20 to 40 wt. % or 25 to 35 wt. % of the pressure-sensitive adhesive mixture.

Most of the tackifier (at least 80%, preferably at least 85%) is preferably introduced into a section of the extruder that is subsequent to the first section, i.e., downstream from where the natural rubber is introduced. Some tackifiers can act as lubricants that inhibit or prevent proper mastication of the rubber, especially if too much tackifier is introduced too early in the process.

Filler

The pressure-sensitive adhesive will include one or more fillers. Fillers normally do not act as accelerators, catalysts, vulcanization aids, or the like. Instead, they provide volume, thickening, and color (frequently white, yellow, or tan) to the pressure-sensitive adhesive. Suitable fillers are well known in the adhesive field. Examples include calcium carbonate, magnesium carbonate, magnesium silicate, titanium dioxide, clays, dolomites, silicas, aluminas, and the like, and mixtures thereof. Calcium carbonate and titanium dioxide are preferred.

The amount of filler needed for the pressure-sensitive adhesive varies and depends on many of the same factors described above for the tackifiers. Additionally, the flow properties and desired viscosity of the adhesive will be factors to consider. Generally, the total amount of filler used will be within the range of 20 to 60 wt. %, 25 to 50 wt. %, or 30 to 40 wt. %, based on the amount of pressure-sensitive adhesive.

The $C_{12}$-$C_{24}$ Fatty Acid

Pressure-sensitive adhesives made by the inventive process include 0.1 to 5 wt. %, 0.15 to 3 wt. %, or 0.2 to 2 wt. %, based on amount of mixture, of an added $C_{12}$-$C_{24}$ fatty acid. Natural rubber already contains certain fatty acids in various proportions depending upon the source of the rubber. The amount discussed here is in addition to any amount that occurs naturally in the rubber. Surprisingly, we found that addition of minor proportion of a $C_{12}$-$C_{24}$ fatty acid allows high-molecular-weight natural rubber to be converted to a pressure-sensitive adhesive using a single- or twin-screw extruder, mild conditions, and reasonably short residence times.

Suitable $C_{12}$-$C_{24}$ fatty acids can be saturated, monounsaturated, or polyunsaturated. Examples include lauric acid, myristic acid, palmitic acid, stearic acid, arachidic acid, behenic acid, palmitoleic acid, oleic acid, linoleic acid, and the like, and mixtures thereof. Saturated $C_{14}$-$C_{20}$ fatty acids, especially saturated $C_{16}$-$C_{18}$ fatty acids are preferred. Preferred fatty acids have melting points greater than 25° C., preferably at least 35° C., at least 50° C., or within the range of 60° C. to 75° C. In a preferred aspect, the fatty acid is stearic acid, palmitic acid, or a mixture thereof. Stearic acid is particularly preferred.

Process for Making the PSA

In a first process step for making the pressure-sensitive adhesive, a mixture comprising the natural rubber, tackifier, filler, and $C_{12}$-$C_{24}$ fatty acid is introduced into a first section of the single- or twin-screw extruder and is masticated. "First section" as used herein refers to one or more extruder sections in which the formulation components are first introduced and are subsequently mixed and masticated. In practice there may be two or more discrete extruder sections in which these steps are accomplished. For instance, in FIG. 1, "first section" refers to S1 and S2. The temperature in this first section is mild, i.e., within the range of 10° C. to 45° C., preferably 20° C. to 30° C. Residence time in the first section is typically less than two minutes, preferably less than one minute.

In a second process step, mastication of the mixture continues in at least one subsequent extruder section at a temperature within the range of 45° C. to 100° C., preferably 50° C. to 90° C., in the presence of additional tackifier. The additional tackifier can be introduced in one or more of the subsequent extruder sections. For instance, in FIG. 1, additional tackifier is introduced at S3 and S5 using hoppers H2 and H3, respectively.

The total residence time of the natural rubber in the extruder is preferably less than five minutes, more preferably less than three minutes.

An advantage of the process is the ability to achieve desirable mastication of the natural rubber in the absence of a chemical peptizer. Peptizers have long been used to accelerate degradation of natural rubber to make it easier to process. However, peptizers are preferably avoided because they can negatively impact performance of the pressure-sensitive adhesive.

PSA Product

Pressure-sensitive adhesives produced in accord with the inventive process have good to excellent homogeneity. In contrast, when adhesives are produced under similar conditions without the added $C_{12}$-$C_{24}$ fatty acid, the homogeneity of the adhesive can suffer, even resembling cottage cheese (see Comparative Example 2 in Table 1, below).

The pressure-sensitive adhesives produced according to the inventive process have relatively low viscosities compared with similar adhesives produced in the absence of the added $C_{12}$-$C_{24}$ fatty acid. In particular, the adhesives have a viscosity, measured at 150° C. and a shear rate of 5000 s$^{-1}$, at least 15% lower, preferably at least 20 or 30% lower, than the viscosity of a pressure-sensitive adhesive prepared by a similar process without the added $C_{12}$-$C_{24}$ fatty acid. Compare the viscosities of the adhesives of Control 1 and Example 1 in Table 1, below.

Duct Tape Production

Pressure-sensitive adhesives made by the inventive process are well-suited for the manufacture of a variety of tapes, particularly duct tapes. Duct tapes are constructed with a flexible polymer backing, a cloth scrim, and the pressure-sensitive adhesive. Typical duct tape construction is shown in U.S. Publ. No. 2003/0215628 and U.S. Pat. Nos. 4,303,724, 5,108,815, and 5,271,999, the teachings of which are incorporated herein by reference. Reduced-viscosity adhesives that retain the good adhesion and flexibility of high-molecular-weight natural rubbers are valuable because they can more easily penetrate the openings in the cloth scrim and form a good bond with both the backing and the scrim.

The backing is normally a flexible polymer, often a polyolefin such as low-density polyethylene (LDPE). The thickness of the backing can vary, but it typically falls within the range of 0.5 to 5 mils, preferably 1 to 4, or 2 to 3 mils. Depending on the intended use, the backing may be a single layer or multiple layers. U.S. Publ. No. 2003/0215628, for instance, illustrates a multi-layer backing with an LDPE outer layer, a core of LDPE, HDPE, of a blend thereof, and an inner LDPE layer. The backing may include, particularly in any outer layer, light-stabilizers, pigments, gloss aids, adhesion promoters (e.g., acrylate homopolymers and copolymers), or other additives. In a preferred aspect, the backing comprises low-density polyethylene.

The cloth scrim consists of fibers arranged perpendicularly to form a mesh pattern. The fibers can be natural or synthetic. Natural fibers include, for instance cotton, flax, hemp, wool, and the like, particularly cotton. Synthetic fibers include polyesters, rayon, acetate, nylon, and the like, especially polyester. In some aspects, the cloth scrim may be produced from combinations or blends of natural and synthetic fibers.

Cloth scrims are identified by the number of threads in the machine direction by the number of threads in the cross direction that will fit within a 1" square of fabric. Thus, a thread count of "18×6" means that the cloth has 18 counts in the machine direction and 6 in the cross direction in the 1" square. The thread count needed for a particular duct tape will depend on its intended use (e.g., light duty versus heavy duty). A denser scrim might have up to 40 or 50 machine-direction threads and up to 20 or 30 cross-direction threads. One premium cotton scrim, for instance, has a thread count of 44×28.

The thickness of the finished duct tape can vary depending on the intended use. Thicknesses for the finished tape will range from 2 to 20 mils, preferably 5 to 15 mils or 7 to 10 mils.

Duct tapes can be manufactured by any suitable method. For instance, the pressure-sensitive adhesive and backing can be co-extruded along with the cloth scrim. In another approach, a calendering process, as described below, is used.

Thus, in one suitable approach to making duct tapes, the pressure-sensitive adhesive leaves the twin-screw extruder and is transferred to a roller mill that consists of closely spaced stainless-steel rollers. The rollers are hollow to allow them to be heated with water or other process fluids. The rollers are attached to high torque gears and a motor that can rotate them at a desired speed. The cylinders are fixed in place so that only a small gap exists between them. As the rollers turn, the adhesive being fed forms a thin sheet across their surface.

Cloth scrim backed with LDPE or other flexible polymers can be fed from a storage roll using another set of rollers to coat the backed scrim with adhesive. Operators can control the gaps between the rollers to control the amount of adhesive being applied to the cloth scrim in this calendering process.

Thereafter, the tape fabric is wound onto large cardboard cores (e.g., about 5' wide, 3' diameter). When enough tape has been coated and the roll is full, it is removed from its spindle and moved to another area where it can be cut to the proper size. This is done by unspooling the large rolls onto a machine equipped with a series of knives. The knives cut the product into narrow segments that can be rewound onto smaller cardboard cores. Finally, the rolls are packaged for sale.

Duct Tape Properties:

Duct tapes made by the inventive process are generally characterized by one or more improved properties, including, for example, adhesion to steel, adhesion to the backing, adhesion bond strength, tack, seven-day clean removability, and other properties. Many of the test methods used to evaluate these properties are explained in more detail below.

As shown in Tables 2-4 below, duct tapes made in accord with the inventive process can provide a 20% or more improvement in adhesion to steel and a 25% or more improvement in adhesion to the backing. Moreover, the tapes demonstrate a substantial improvement over the controls in seven-day clean removability from difficult substrates, particularly ceramic tile and marble.

The following examples merely illustrate the invention; the skilled person will recognize many variations that are within the spirit of the invention and scope of the claims.
Continuous Process for Manufacture of a Pressure-Sensitive Adhesive A co-rotating twin-screw extruder (F. Ili Maris, S.p.A., Italy) configured as in FIG. 1 and having a screw diameter of 150 mm and a length-to-diameter ratio of 54 is used.

Sections 2 and 4 (S2 and S4) are rubber mastication sections in which the molecular weight of the rubber is reduced by mechanical energy. Sections 1, 3, and 5 (S1, S3, and S5) are conveying sections in which materials are transported to the next extruder section. Section 6 (S6) is both a dispersion and a conveying section, where the final adhesive is discharged to a downstream conveying belt before being charged to a calender for duct tape processing. The temperatures used in each section are as follows: S1: 70° F.; S2: 70° F.; S3: 100° F.; S4: 115° F.; S5: 115° F.; and S6: 170° F.

Hoppers 1-3 (H1-H3) are configured as shown in FIG. 1. The following adhesive components in the amounts shown in Table 1 are introduced into Hopper 1: natural rubber (SIR-3 rubber, a technically specified rubber (TSR) grade from Indonesia), calcium carbonate, low-density polyethylene, Piccotac™ 1098 hydrocarbon resin ($C_5$ aliphatic resin, product of Eastman), Resin P rosin acid dimer (product of Eastman), titanium dioxide, Wingstay® L polyphenolic antioxidant (butylated reaction product of p-cresol and dicyclopentadiene, product of Omnova), and Industrene® R stearic acid/palmitic acid mixture (product of PMC Biogenics).

The SIR-3 natural rubber feed has a Mooney viscosity of 94 (measured with top and bottom plates set to 212° F.; 1" cube sample) and the following molecular weight characteristics (by gel-permeation chromatography): $M_n$: 205,000; $M_w$: 2,174,000; polydispersity index: 10.6. GPC conditions: Waters Breeze™ 2 system; Styragel® HR1 and Styragel® E1 columns (Waters); 30-mg sample in 10 mL of tetrahydrofuran.

These components are introduced into Hopper 2: calcium carbonate, Piccotac™ 1098 hydrocarbon resin, and AO2246 antioxidant (2,2'-methylene-bis(4-methyl-6-tert-butylphenol).

For Hopper 3, the only component added is Piccotac™ 1098 hydrocarbon resin.

TABLE 1

Natural Rubber Formulation, Point of Extruder Entry, and Results

| Example | Control 1 wt. % | Comp. Ex 1, wt. % | Comp. Ex. 2, wt. % | Ex. 1, wt. % |
|---|---|---|---|---|
| Hopper 1 | | | | |
| SIR-3 natural rubber | 29.9 | 29.9 | 29.9 | 29.7 |
| CaCO₃ | 20.7 | 20.7 | 20.7 | 20.7 |
| LDPE | 5.0 | 5.0 | 5.0 | 4.7 |
| Piccotac ™ 1098 resin | 3.6 | 2.6 | 2.6 | 2.6 |
| Resin P rosin acid resin | 2.6 | 2.6 | 2.6 | 2.6 |
| TiO₂ | 0.89 | 0.89 | 0.89 | 0.89 |
| Wingstay ® L antioxidant | 0.34 | 0.34 | 0.34 | 0.34 |
| Industrene ® R stearic acid | 0 | 0 | 0 | 0.5 |
| Hopper 2 | | | | |
| CaCO₃ | 13.4 | 13.4 | 13.4 | 13.4 |
| Piccotac ™ 1098 resin | 6.81 | 7.31 | 5.81 | 5.81 |
| AO 2246 antioxidant | 0.82 | 0.82 | 0.82 | 0.82 |
| Hopper 3 | | | | |
| Piccotac ™ 1098 resin | 15.94 | 16.44 | 17.94 | 17.94 |
| Total wt. % | 100 | 100 | 100 | 100 |
| Adhesive homogeneity | excellent | marginal | poor | excellent |
| Adhesive viscosity (Pa · s) at 300° F. and shear rate 5000s$^{-1}$ | 28.5 | 27.5 | — | 22.5 |

As shown in Table 1, the main difference between Control 1 and Comparative Example 1 is the distribution of the Piccotac™ 1098 resin among Hoppers 1-3. The total amount of Piccotac™ 1098 resin is the same in these examples. However, in Comparative Example 1, Hopper 1 has less Piccotac™ 1098 than the amount used in Control 1, while both Hoppers 2 and 3 have more Piccotac™ 1098 than the amount used in the control. Although there is a slight reduction in viscosity for Comparative Example 1, the resulting adhesive has only marginal homogeneity.

Comparative Examples 1 and 2 differ in the distribution of Piccotac™ 1098 between Hoppers 2 and 3. In Comparative Example 2, Hopper 2 has less Piccotac™ 1098 than the amount used in Comparative Example 1, while Hopper 3 has more Piccotac™ 1098 than the amount used in Comparative Example 1. However, in Comparative Example 2, the adhesive appearance is poor (like cottage cheese), and the viscosity is not measured.

Example 1 includes 0.5 wt % of stearic acid/palmitic acid mixture in Hopper 1 with a slight reduction in the amounts of natural rubber and LDPE to maintain a constant total mass balance. Inclusion of the fatty acid is the main difference between Example 1 and Comparative Example 2. The distribution of Piccotac™ 1098 among Hoppers 1-3 is the same for Example 1 and Comparative Example 2. Interestingly, the resulting adhesive in Example 1 is homogeneous and has a viscosity (22.5 Pa·s) that is 21% lower than that of the Control.

Thus, adding 0.5 wt. % of $C_{16}$-$C_{18}$ fatty acid in Hopper 1 improves the mixing uniformity of the adhesive and also decreases adhesive viscosity. Without any fatty acid in Hopper 1, the operator has to reduce the output of extruder or tolerate the high adhesive viscosity due to inadequate mastication of the natural rubber.

Test Methods for Adhesive Tapes

Generally, the test methods and equipment used are described in Pressure Sensitive Tape Council (PSTC) Test Methods, 15th Ed. Unless otherwise indicated, room conditions for all tests are kept at 73.4±3.6° F. and 50±2% relative humidity. Similar test methods are also described in U.S. Publ. No. 2003/0215628, the teachings of which are incorporated herein by reference.

Adhesion to Steel (PSTC 101/Test Method A)

Before use, each test panel is cleaned. Acetone or methyl ethyl ketone is used for metals. Isopropyl alcohol is used for plastics. Delicate surfaces are simply wiped to remove dust. A 1"-wide strip of tape is applied to a standard test panel with controlled pressure. Pressure is applied using either a mechanically operated 4½ lb. roller or a hand-operated, PSTC-approved 4.5 lb. rubber-covered roller. The tape is peeled from the panel at a 180° angle at a rate of 12±0.05 inches per minute, during which time the force required to peel is measured.

Adhesion to Backing (PSTC 101/Test Method B)

A strip of tape is applied to a rigid panel. A second strip of the tape is applied to the backing of the first strip and tested for peel adhesion as described in Method A.

Shear Adhesion (PSTC 107/Procedure A)

A 1"-wide strip of tape is applied to a standard steel panel under controlled roll down. Pressure is applied using either a mechanically operated 4½ lb. roller or a hand-operated, PSTC-approved 4.5 lb. rubber-covered roller. The panel is mounted vertically, a standard mass of 1 kg is attached to the free end of the tape, and the time to failure is determined.

Unwind Adhesion (PSTC 8)

Unwind adhesion is the force required to remove the tape from the roll under prescribed conditions.

The mandrel is fitted into the lower jaw of the tensile tester, and the free end of the mandrel is inserted through the roll of tape. The location of the tape roll is adjusted so that when the free end of the tape is placed in the upper clamp, the unwound tape remains in a vertical plane between the two clamps. Clamp separation is operated at 12 inches per minute. After 1 inch of tape has been unwound, the average value of the unwind force is observed while unwinding the next 3 inches.

High-Speed Unwind Adhesion (PSTC 13)

High-speed unwind adhesion is the force required to remove the tape from the roll under prescribed conditions. An unwind machine capable of unwinding the roll at a rate of 200 ft/min and having means of sensing and indicating the unwind force measured parallel to the unwinding strip is used. The test is performed at an unwind rate of 100 ft/min, and the unwind adhesion force is measured.

Rolling Ball Tack (PSTC 6)

The rolling ball tack test is one measure of the capacity of the adhesive to form a bond with the surface of another material upon brief contact under virtually no pressure. Prior to each roll, an 11-mm stainless-steel ball is carefully cleaned with methyl ethyl ketone. The ball is wiped with a paper towel to remove any remaining residue. The ball is released from the top of a ramp and is allowed to roll to a stop on the adhesive. The distance from where the ball stops to the point where the ball first touches the adhesive surface is measured and recorded.

Adhesion Bond Strength (Modified PSTC 8)

Adhesion bond strength is a measure of the force required to separate the fabric from the polyolefin backing in duct tape. It should be greater than the force required to unwind the roll of tape to avoid the possibility of delamination of the tape during unwinding.

1. A roll of tape is prepared by unwinding a few inches of tape from the roll. Then, using a sharp knife, and holding both the roll and the loose end of the tape tightly, a cut is made across the entire top layer of polyethylene remaining on the roll as close as possible to the exposed adhesive surface of the unwound portion.

2. After cutting the top layer of polyethylene, an attempt is made to separate the polyethylene from the fabric to which it is bonded by first pulling the polyethylene layer loose by hand. Then, if the polyethylene will release from the fabric, the loose end of the tape is pulled.

3. If the polyethylene will separate from the fabric, the adhesion bond strength is measured.

4. The mandrel is fitted into the lower jaw of the tensile tester, and the free end of the mandrel is inserted through the roll of tape. The location of the tape roll is adjusted so that when the free end of the tape is placed in the upper clamp, the unwound tape remains in a vertical plane between the two clamps. Clamp separation is operated at 12 inches per minute.

5. After 1 inch of tape has been unwound, the average value of the unwind force is observed while unwinding the next 3 inches. The adhesion bond strength is reported in pounds per inch, to the nearest 0.1 lb. If the tape width is not 1 inch, the test result is divided by the actual width of the tape.

Delta Bond

Delta bond is calculated by subtracting adhesion bond strength (lb/in) from unwind adhesion (lb/in).

Accelerated Aging (PSTC 9)

This procedure simulates the natural aging of the tape from 9 to 15 months. The tests performed are an estimate of how well the tape will react over time. Sample rolls are conditioned at 120° F., 80% relative humidity, for 36 hours prior to testing using the above-described procedures.

Preparation of Duct Tapes Using the Pressure-Sensitive Adhesive

Duct tapes are made by a calender process as described earlier. Adhesive made from SIR-3 natural rubber (Mooney viscosity 93) is laminated onto a polyethylene backing (about 2.5 mils) along with a cloth scrim (thread count 18×6) according to the desired product specifications. The target tape thickness is 9.3 mils. Tape physical properties from the adhesives prepared above as Control 1 and Example 1 are shown in Table 2.

TABLE 2

Properties of Duct Tapes

|  | Control 1 | Ex. 1 |
|---|---|---|
| Properties of unaged tapes | | |
| Adhesion to steel (oz/in) | 53.1 | 61.8 |
| Adhesion to backing (oz/in) | 23.6 | 29.5 |
| Shear (steel, min) | 5700+ | 5700+ |
| Bond (lb/in) | 4.43 | 4.90 |
| Unwind (lb/in) | 1.30 | 1.23 |
| Delta bond (lb/in) | 3.13 | 3.67 |
| High-speed unwind (oz/in) | 11.1 | 10.9 |
| Rolling ball (in) | 1.48 | 1.66 |
| Adhesive weight (oz/yd$^2$) | 4.40 | 4.79 |
| Tape gauge (mils) | 8.88 | 9.07 |
| Properties of aged tapes (36 h, 120° C., 80% RH) | | |
| Aged Adhesion to steel (oz/in) | 60.0 | 58.5 |
| Aged Adhesion to backing (oz/in) | 26.6 | 31.3 |
| Aged Bond (lb/in) | 6.02 | 7.02 |
| Aged Unwind (lb/in) | 2.31 | 2.53 |
| Delta bond (lb/in) | 3.71 | 4.49 |
| Aged High-speed unwind (oz/in) | 52.9 | 54.9 |
| Aged Rolling ball (in) | 1.01 | 1.90 |

As shown in Table 2, adhesion to steel increases 16% (from 53 to 62 oz/in) when a $C_{16}$-$C_{18}$ fatty acid is included in Hopper 1. The adhesion bond strength also increases from 4.4 to 4.9 lb/in, which suggests improved resistance to delamination and defect formation during use of the tape.

Residue Testing:

Freshly produced tapes are applied to various substrate surfaces to evaluate their performance in resisting adhesive residue for a dwell time of 7 days. The tapes are removed at peel rate of 3 in./s and the surfaces are examined for the presence of any adhesive residue.

The duct tape from Control 1 leaves a bad residue on marble, ceramic tile, and laminate flooring, but it leaves no residue on carpet.

In contrast, the duct tape from Example 1 leaves no residue on marble, ceramic tile, laminate flooring, or carpeting. Thus, the inventive adhesive demonstrates a substantial improvement over the control in seven-day clean removability from difficult substrates, particularly ceramic tile and marble.

Additional duct tapes are made by a calender process. Adhesive made from SIR-3 natural rubber (Mooney viscosity 91) is laminated onto a polyethylene backing (about 2.5 mils) along with a cloth scrim (thread count 18×6) according to the desired product specifications. Target tape thickness: 9.3 mils. Tape physical properties from the adhesives prepared above as a control and this Example 2 are shown in Table 3.

TABLE 3

Properties of Duct Tapes

|  | Control 2 | Ex. 2 |
|---|---|---|
| Properties of unaged tapes | | |
| Adhesion to steel (oz/in) | 58.7 | 62.2 |
| Adhesion to backing (oz/in) | 27.7 | 25.7 |
| Shear (steel, min) | 5700+ | 5700+ |
| Bond (lb/in) | 4.64 | 5.06 |
| Unwind (lb/in) | 1.16 | 1.20 |
| Delta bond (lb/in) | 3.58 | 3.86 |
| High-speed unwind (oz/in) | 6.38 | 11.5 |
| Rolling ball (in) | 3.27 | 1.59 |
| Adhesive weight (oz/yd$^2$) | 5.36 | 5.49 |
| Tape gauge (mils) | 9.75 | 9.52 |
| Properties of aged tapes (36 h, 120° C., 80% RH) | | |
| Aged Adhesion to steel (oz/in) | 61.1 | 48.0 |
| Aged Adhesion to backing (oz/in) | 31.2 | 25.0 |
| Aged Bond (lb/in) | 7.97 | 7.13 |
| Aged Unwind (lb/in) | 5.23 | 4.37 |
| Delta bond (lb/in) | 5.23 | 4.37 |
| Aged High-speed unwind (oz/in) | 33.8 | 58.9 |
| Aged Rolling ball (in) | 2.10 | 0.87 |

As shown in Table 3, adhesion to steel increases (from 59 to 62 oz/in) when a $C_{16}$-$C_{18}$ fatty acid is included in Hopper 1. The adhesion bond strength also increases from 4.6 to 5.1 lb/in, which suggests improved resistance to delamination and defect formation during use of the tape.

Residue Testing:

The duct tape from Control 2 leaves a bad residue on marble, ceramic tile, and laminate flooring, but it leaves no residue on carpet.

In contrast, the duct tape from Example 2 leaves no residue on marble, ceramic tile, laminate flooring, or carpeting. Thus, the inventive adhesive again demonstrates a substantial improvement over the control in seven-day clean removability from difficult substrates, particularly ceramic tile and marble.

Additional duct tapes are made by a calender process. Adhesive made from SIR-3 natural rubber (Mooney viscosity 95) is laminated onto a polyethylene backing (about 2.25 mils) with a thin layer of ethylene methyl acrylate copolymer (EMA) as an adhesion promoter, along with a cloth scrim (thread count 38×14) according to the desired product specifications. The target tape thickness is 12.5 mils. Tape physical properties from the adhesives prepared above as a control and this Example 3 are shown in Table 4.

For this trial, a third lot of SIR-3 rubber is used. A denser scrim (38×14) is used. Target tape thickness: 12.5 mils. Adhesion to steel increases 19% from 50.4 to 59.9 oz/in for Example 3 as compared to Control 3. Adhesion bond to the backing is not tested because the backing includes a layer of EMA adhesion promoter, which should provide adequate adhesion bond. The tape of Example 3 has a lower rolling ball number compared with that of the control, indicating higher tack.

TABLE 4

Properties of Duct Tapes

|  | Control 3 | Ex. 3 |
|---|---|---|
| Properties of unaged tapes | | |
| Adhesion to steel (oz/in) | 50.4 | 59.9 |
| Adhesion to backing (oz/in) | 23.6 | 31.0 |
| Shear (steel, min) | 5700+ | 5700+ |

TABLE 4-continued

Properties of Duct Tapes

| | Control 3 | Ex. 3 |
|---|---|---|
| Unwind (lb/in) | 1.25 | 1.17 |
| High-speed unwind (oz/in) | 17.7 | 18.9 |
| Rolling ball (in) | 1.30 | 0.82 |
| Adhesive weight (oz/yd$^2$) | 9.00 | 9.54 |
| Tape gauge (mils) | 12.0 | 12.4 |
| Backing gauge (mils) | 2.30 | 2.30 |
| Properties of aged tapes (36 h, 120° C., 80% RH) | | |
| Aged adhesion to steel (oz/in) | 52.4 | 42.5 |
| Aged adhesion to backing (oz/in) | 26.0 | 23.8 |
| Aged unwind (lb/in) | 2.06 | 1.89 |
| Aged high-speed unwind (oz/in) | 48.8 | 49.0 |
| Aged rolling ball (in) | 0.77 | 1.42 |

The preceding examples are meant only as illustrations; the following claims define the inventive subject matter.

I claim:

1. A continuous process for making a pressure-sensitive adhesive, comprising: (a) in a single- or twin-screw extruder, in a first section at a temperature within the range of 10° C. to 45° C., masticating a mixture comprising natural rubber having a Mooney viscosity within the range of 85 to 100, a tackifier, and a filler in the presence of 0.1 to 5 wt. %, based on the amount of mixture, of an added $C_{12}$-$C_{24}$ fatty acid; and (b) continuing to masticate the mixture in at least one subsequent extruder section at a temperature within the range of 45° C. to 100° C. in the presence of additional tackifier to produce a homogeneous pressure-sensitive adhesive having a viscosity, measured at 150° C. and a shear rate of 5000 s$^{-1}$, at least 15% lower than the viscosity of a pressure-sensitive adhesive prepared by a similar process without the added $C_{12}$-$C_{24}$ fatty acid.

2. The process of claim 1 wherein the natural rubber has a Mooney viscosity within the range of 90 to 98.

3. The process of claim 1 wherein the natural rubber has, as measured by gel permeation chromatography, a weight-average molecular weight of at least 0.5×10$^6$ g/mol and a polydispersity of at least 4.5.

4. The process of claim 1 wherein the tackifier comprises a resin selected from the group consisting of rosin acids, partially polymerized rosin acids, rosin esters, terpene ester resins, hydrocarbon resins, terpene resins, terpene-phenol resins, terpene-hydrocarbon resins, and mixtures thereof.

5. The process of claim 1 wherein the filler comprises a compound selected from the group consisting of calcium carbonate, magnesium carbonate, magnesium silicate, titanium dioxide, clays, dolomites, silicas, aluminas, and mixtures thereof.

6. The process of claim 1 wherein the fatty acid has a melting point greater than 25° C.

7. The process of claim 1 wherein the fatty acid is selected from the group consisting of stearic acid, palmitic acid, and mixtures thereof.

8. The process of claim 1 performed in the presence of 0.2 to 2 wt. %, based on the amount of mixture, of the added $C_{12}$-$C_{24}$ fatty acid.

9. The process of claim 1 wherein the pressure-sensitive adhesive has a viscosity, measured at 150° C. and a shear rate of 5000 s$^{-1}$, at least 20% lower than the viscosity of a pressure-sensitive adhesive prepared by a similar process without the added $C_{12}$-$C_{24}$ fatty acid.

10. The process of claim 1 wherein the temperature in the first section is within the range of 20° C. to 30° C.

11. The process of claim 1 wherein at least 80 wt. % of the tackifier is introduced in a section of the extruder subsequent to the first section.

12. The process of claim 1 performed in the absence of a chemical peptizer.

13. The process of claim 1 wherein the residence time of the natural rubber in the extruder is less than five minutes.

14. A process for making a duct tape, comprising:
  (a) in a single- or twin-screw extruder, in a first section at a temperature within the range of 10° C. to 45° C., masticating a mixture comprising natural rubber having a Mooney viscosity within the range of 85 to 100, a tackifier, and a filler in the presence of 0.1 to 5 wt. %, based on the amount of mixture, of an added $C_{12}$-$C_{24}$ fatty acid;
  (b) continuing to masticate the mixture in at least one subsequent extruder section at a temperature within the range of 45° C. to 100° C. in the presence of additional tackifier to produce a homogeneous pressure-sensitive adhesive having a viscosity, measured at 150° C. and a shear rate of 5000 s$^{-1}$, at least 15% lower than the viscosity of a pressure-sensitive adhesive prepared by a similar process without the added $C_{12}$-$C_{24}$ fatty acid; and
  (c) calendering the pressure-sensitive adhesive onto a backing comprising a polyolefin and a cloth scrim to produce the duct tape.

15. The process of claim 14 wherein the polyolefin is low-density polyethylene.

* * * * *